United States Patent Office 3,328,248
Patented June 27, 1967

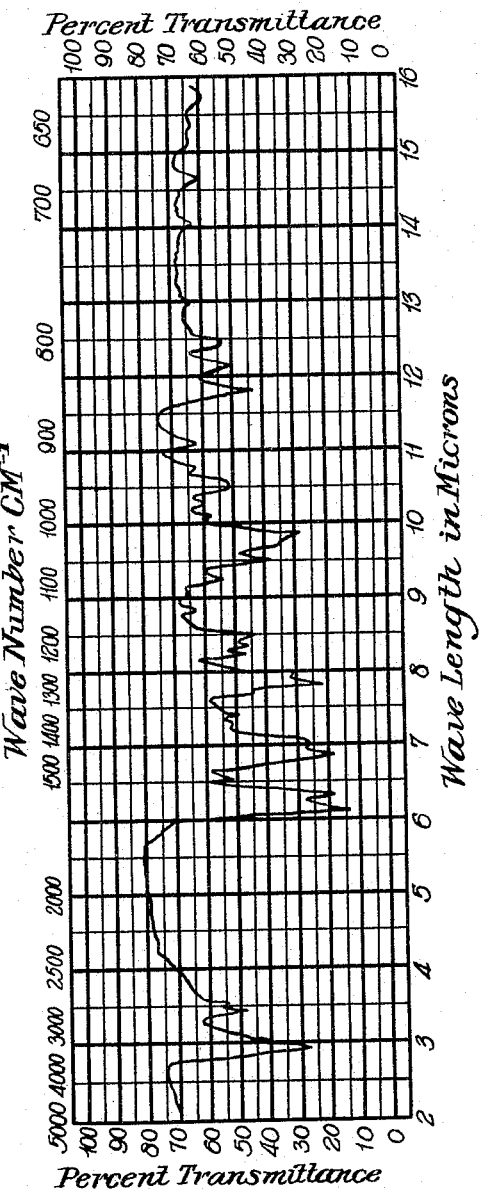

3,328,248
ANTIBIOTIC PRODUCT AND PROCESS OF PRODUCING SAME
Koppaka V. Rao, Pine Brook, William S. Marsh, Wanaque, and Donald W. Renn, River Vale, N.J., assignors to Chas. Pfizer & Co., Inc., New York, N.Y., a corporation of Delaware
Filed Oct. 10, 1962, Ser. No. 229,660
5 Claims. (Cl. 167—65)

This invention relates to the cultivation under controlled conditions of the new species, *Streptomyces aspergilloides*, to the biologically active substance produced thereby, and to methods for the recovery and concentration from crude solutions, including fermentation broths, of this new and useful substance. More particularly this invention relates to the antibiotic substance isolated therefrom in both the crude and purified forms, and to the methods for the preparation, isolation and purification of said antibiotic substance.

The antibiotic substance, designated hereinafter as BA–181314A, possesses useful antimicrobial activity against a variety of organisms. This permits its application in agriculture. The new antibiotic may be used in industrial fermentations to prevent contamination by sensitive organisms. The antibiotic, in addition is useful for separating mixtures of microorganisms for medical diagnostic and research purposes. Furthermore, the antibiotic shows activity against human carcinoma cells in vitro.

The organism which is employed in the valuable process of the present invention was obtained from a soil sample collected in Guatemala and isolated on an agar formulation of the following composition:

| | Gm./liter |
|---|---|
| Glycerol | 15.0 |
| Beef extract | 7.5 |
| Peptone | 7.5 |
| Agar | 15.0 |
| NaCl | 3.0 |

Distilled water to volume, initial Ph, 7.0

A sample of one strain of this new species has been deposited in the American Type Culture Collection in Washington, D.C., and assigned ATCC No. 14808. It is identified in the records of Chas. Pfizer & Co., Inc., as the type culture BA–181314A. The isolated culture was identified by Dr. J. B. Routien as a member of the new species *Streptomyces aspergilloides* and the cultural characteristics are set forth in Table I. These results were obtained after two to four weeks growth at 28° C.

TABLE I.—CULTURAL CHARACTERISTICS OF *STREPTOMYCES ASPERGILLOIDES* SP. NOV., BA–181314A

| Medium | Amount of Growth | Aerial Mycelium and Spores | Soluble pigment | Remarks |
|---|---|---|---|---|
| Glucose asparagine agar | Moderate | Aerial mycelium moderate grayish brown. | Lacking | Reverse gray. |
| Synthetic | Poor, very thin | Lacking | do | Reverse white. |
| Gauze's Medium No. 1 | Moderate | Aerial mycelium moderate, slightly fluffy, from dull white to Ridgway's "Pallid Brownish Drab." | do | Reverse lighter than Ridgway's "Pale Olive Buff"; some dissociation into sporulated and nonsporulated areas. Some hyphae of aerial mycelium wider than others and swollen at intervals. Branches terminating in chains of spores were borne variously: singly and scattered on the hyphae; singly in a verticil at the swollen place on the wide hyphae; most often as well-developed branches arising in a verticil at the swollen part of the hypha and terminating in a round to clavate vesicle from which chains of spores arose in columnar or radiate manner; chains straight or slightly curved. Spores cylindrical with both rounded and squared-off ends, 1.3 x 0.7µ. |
| Calcium Malate | Poor, thin, flat | Lacking | Lacking | Vegetative mycelium and reverse colorless; no digestion. |
| Cellulose | No growth | | | |
| Skimmed Milk | Moderate, creamy brown in color. | Lacking | Very pale pink buff; after one month soluble pigment near Ridgway's "Clay Color." | No coagulation; no hydrolysis; pH changed from 6.4 to 6.1. |
| Potato Plug | Good | Aerial mycelium grayish white in spots. | Pale pinkish after 14 days; after 1 month soluble pigment was gray. | Vegetative mycelium ranging from flesh color to light olive. |
| Nutrient Agar | Poor to moderate | Lacking | Lacking | Vegetative mycelium dull creamy white; reverse white. |
| Glucose Agar | Moderate | Light gray | Very light yellow-brown. | Reverse light brownish. |
| Emerson's Agar | do | do | Slight yellowish | Reverse grayish white. |
| Pridham's Yeast Extract Agar. | Excellent | Good, buff to light gray | Very slight yellowish | Reverse gray-brown in center and white around edge. |
| Hickey and Tresner's Agar | Good | Good, light gray | Lacking | Reverse grayish brown. |
| Gelatin | | | do | Very slight liquefaction. |
| Starch Agar | Very poor, flat | Lacking | Lacking | Vegetative mycelium and reverse colorless; hydrolysis good. |
| Organic Nitrate Broth | | | | Nitrites produced from nitrates. |
| Inorganic Nitrate Broth | | | | Do. |
| Peptone Iron Agar | | | | No H₂S produced after 4 or 24 hours o 4 days. |

It is to be understood that for the production of the antibiotic substance according to the present invention, limitation to the aforesaid organism is not intended. It is especially desired and intended to include mutants produced from this organism by various means such as irradiation with X-rays or ultraviolet light, treatment with nitrogen mustards, and the like.

It is also desired and intended to include any organism regardless of its appearance or physiological behavior, that may be developed by means of transformation, transduction, genetic recombination or some other genetic procedure using a nucleic acid from the herein described species, whereby it has acquired the ability to produce the elaboration product here described or to carry on the biochemical change here described.

For preparation of the new substance, a wide variety of fermentation media are satisfactory. A medium composed basically of a source of assimilable nitrogen, a source of carbohydrate, and a source of minerals is required. Satisfactory nitrogen sources include hydrolyzed casein of various types, soy bean meal, distillers' solubles, corn meal, nitrates, ammonium salts, urea and the like. Suitable carbohydrate sources include corn starch, dextrose, lactose, dextrin, etc. The preceding materials frequently contain sufficient minerals to satisfy the mineral requirement of the organism without substantial addition of mineral components. A suitable aqueous nutrient medium as used, for example, in the instant invention, contains by weight 1% glucose, 1.5% soybean meal, 0.5% distillers' solubles, 0.5% sodium chloride, 0.2% dibasic potassium phosphate and 0.1% calcium carbonate. The pH of the fermentation is most suitably maintained at about 7.0 to 7.2. After autoclaving and inoculating, the fermentation is carried out at a temperature usually between about 28° and about 30° C., with aeration. In the laboratory, Fernback flasks mechanically shaken to provide aeration and agitation, are suitable for propagation of the culture, while the plant, standard fermentation vessels, familiar to those skilled in the art, equipped for submerged aerobic fermentation may be employed. Aseptic conditions should be maintained, of course, throughout the transfer of the inoculum and growth of the organism.

The growth of the microorganism and antibiotic production usually reach a maximum after about 48 to 72 hours at 30° C. However, the optimum fermentation time will vary with temperature, variation in the equipment used, rate of aeration, stirring, etc. A period of at least 24 hours is required in any case. Ordinarily, there is no advantage to fermentation periods in excess of about three days. The broths show some antibacterial activity against *B. subtilis* which may be used for following the progress of the fermentation.

After a satisfactory level of antibacterial activity has been attained, the active substance may be isolated from the filtered broth by means of water-immiscible organic solvents such as n-butanol at a pH range of 4 to 8. The extraction need not be limited to n-butanol, but other solvents such as ethyl acetate, methyl isobutyl ketone, and chloroform may be used. The volume of solvent is not critical, but about a half volume of solvent is appropriate and provides good recovery. The resulting butanol extract is concentrated azeotropically under reduced pressure to remove most of the solvent. Preferably, the n-butanol concentrate is thereafter further extracted with chloroform or ethyl acetate to provide a higher recovery of the antibiotic material of the instant invention. The concentrated choloform or ethyl acetate extract may thereafter be further purified by column chromatography or by countercurrent distribution.

Fur further purification of said chloroform or ethyl acetate extract by chromatography, said extract is passed in benzene through a chromatographic column of silicic acid and cellulose powder (2:1) in benzene. Thereafter, the column is eluted with a solvent mixture of benzene-chloroform (1:1). The activity is followed by optical density at 360 m$\mu$ and by activity against *B. subtilis* by the standard plate assay method. The eluate thus obtained is concentrated to a small volume and the product, BA–181314A, is crystallized from methanol.

Further purification of the hereinbefore disclosed extract obtained from the filtered broth may be accomplished by counter-current distribution in the system chloroform-ligroin-methanol-0.5% aqueous sodium chloride (3:1:3:1). The activity is followed by optical density at 360 m$\mu$ and by activity against *B. subtilis* by the standard plate assay method. The active fractions thus obtained are combined, concentrated and extracted with chloroform. The chloroform extract is concentrated to dryness. The product, BA–181314A, is crystallized from methanol.

Antibiotic BA–181314A crystallizes from pyridine-methanol (1:3) solution as pale yellow rectangular plates. It exhibits a melting point with decomposition at 315–320° C. The compound exhibits extremely low solubility in the common cryoscopic and ebullioscopic solvents, such as chloroform, methanol and acetone. The compound produces a green color in alcoholic ferric chloride, a yellow color in concentrated sulfuric acid, a purplish red color in concentrated nitric acid, a reddish brown color and a precipitate in alcoholic lead acetate, and although not soluble in 1 N sodium hydroxide, the compound slowly changes to a yellow solid. Elemental analysis reveals approximately 59.3% carbon, 4.6% hydrogen, 5.1% nitrogen, the balance being oxygen, and a methoxyl content of 5.5%. The molecular weight of the product, obtained on the basis of the methoxyl content, is 564. The calculated empirical formula for antibiotic BA–181314A is $C_{28}H_{26}O_{11}N_2$ with a molecular weight of 566. The composition required for the empirical formula is 59.4% carbon, 4.6% hydrogen, and 5.0% nitrogen, and a methoxyl content of 5.5%. The antibiotic shows ultraviolet absorption maxima at 250 m$\mu$, $E_{1cm}^{1\%}$=438, at 361 m$\mu$, $E_{1cm}^{1\%}$=285 and at 375 m$\mu$, $E_{1cm}^{1\%}$=308

A 1% solution of the product in dimethyl formamide exhibits no optical rotation. It exhibits absorption maxima at the following wave lengths in the infrared region of the spectrum when measured on a KBr pellet containing 1% of the product: 3400, 2900, 2825, 1630, 1575, 1525, 1460, 1420, 1350, 1298, 1278, 1255, 1212, 1193, 1175, 1128, 1100, 1078, 1048, 1012, 990, 972, 952, 942, 928, 899, 845, 822, 802, 772, 712, 683 and 637 cm.$^{-1}$. The infrared absorption spectrum is shown in the accompanying drawing, FIGURE I.

The antibiotic of said invention exhibits significant activity against a wide variety of microorganisms. It is particularly noteworthy in its action on gram-positive organisms and its activity against HeLa cells in tissue culture. It is lethal to HeLa cells grown in tissue culture at concentrations of 0.02–0.05 mcg./cc.

Table 2 illustrates the activity of crystalline antibiotic BA–181314A against a group of microorganisms which cause various diseases. These tests were conducted by seeding nutrient broth containing various concentrations of the pure antibiotic with the particular organism specified. The "minimum inhibitory concentration" (MIC) indicated in Table 2 is the minimum concentration of the antibiotic (in micrograms/milliliter) at which growth of the microorganism failed to occur.

TABLE 2.—ANTIBACTERIAL ACTIVITY OF BA–181314A

| Microorganism: | MIC, mcg./ml. |
|---|---|
| *Staphylococcus aureus* | 0.0005 |
| A/R *Staphylococcus aureus* 400 | 0.00005 |
| *Streptococcus pyogenes* | 0.0001 |
| *Streptococcus pyogenes* 98 | 0.0001 |
| *Streptococcus faecalis* | 0.019 |
| *Diplococcus pneumoniae* | 0.0001 |
| *Erysipelothrix rhusiopathiae* | 0.0001 |
| *Candida albicans* 8 | 0.39 |
| *Candida albicans* 13 | 0.39 |

The aforesaid crystalline antibiotic, BA–181314A, was also found to possess particularly pronounced tumor-inhibiting activity against human carcinoma cells (strain HeLa) grown in cell culture according to the procedure described by Rightsel et al. (Journal of Immunology, 76, 464–74, (1956). In this test, the activity of said antibiotic BA–181314A is detected at levels as low as 0.02 to 0.05 mcg. per cc. At these concentrations there is extensive destruction of the tumor cells into vitro.

The active substance of the present invention was tested for anti-tumor activity against Crocker sarcoma 180 in mice, hereinafter referred to as S–180, according to the procedure described by Reilly et al., Cancer Research, 13, No. 9, 684–7 (September 1953). The active substance of the present invention was also tested for anti-tumor activity against established adenocarcinoma, hereinafter referred to as Established CA–755, according to the procedure described by Gellhorn et al., Cancer Research, Supplement III, page 38 (1955). In both tests, the substance of the present invention exhibited pronounced activity as an anti-tumor agent. See Table 3.

TABLE 3.—ANTI-TUMOR ACTIVITY OF BA–181314A

| Dose mg./kg. | Number of Survivors | Percent Inhibition | Type of Tumor |
|---|---|---|---|
| 0.3 | 5/6 | 65 | S–180. |
| 0.2 | 6/6 | 67 | S–180. |
| 0.1 | 6/6 | 61 | S–180. |
| 0.3 | 4/6 | 78 | S–180. |
| 0.1 | 6/6 | 58 | S–180. |
| 0.4 | 6/6 | 80 | Ext. Ca–775. |
| 0.4 | 4/6 | 84 | Est. Ca–775. |
| 0.25 | 10/10 | 66 | Est. Ca–775. |
| 0.25 | 10/10 | 62 | Est. Ca–775. |

The present invention embraces the process for growing *Streptomyces aspergilloides* under controlled conditions and the antibiotic produced thereby. The culture is grown submerged in an aqueous nutrient medium as hereinbefore described. The medium is adjusted to pH 7.0 and the broth sterilized. It is inoculated with 2 to 5% of a 40–50 hour old culture grown in the same medium. The fermentation is carried out at 28° to 30° C. with mechanical aeration for from about 48 to 72 hours. The progress of the fermentation is followed by the activity of the broth against *B. subtilis*.

After a satisfactory level of antibiotic activity has been obtained, the active substance may be isolated by procedures well known to those skilled in the art, as for example, by the procedure set forth hereinbefore. Further purification of the active substance may be accomplished by means of column chromatography or by means of counter-current distribution. The product so obtained is antibiotic BA–181314A.

The following examples are given by way of illustration and are not to be construed as a limitation of this invention, many variations of which are possible without departing from the spirit or scope thereof.

*Example I*

A fermentation broth of the following composition is prepared, adjusted to pH 7.0 and sterilized:

|  | G./l. |
|---|---|
| Glucose | 10 |
| Soybean meal | 15 |
| Distillers' solubles | 5 |
| Sodium chloride | 5 |
| Dibasic potassium phosphate | 2 |
| Calcium carbonate | 1 |

Tap water to volume.

Inoculum is prepared by transferring a slant of *Streptomyces aspergilloides* (ATCC No. 14808) to a portion of this medium and incubating for about 48 hours at 28° C. on a rotary shaker. The main batch of medium is then inoculated with 5% by volume of the inoculum so prepared. The inoculated medium is incubated at 26°–30° C. with agitation and aeration at the rate of about one volume of air per volume of broth per minute. Progress of the fermentation is followed by testing samples of the broth against *B. subtilis*. After 65 hours, the fermentation is halted. A broth with high antibiotic activity and activity against S–180 and Ca–755 tumors in mice and HeLa cells in tissue cultures is obtained.

*Example II*

The fermentation broth obtained as described in Example I is filtered, and the filtrate is extracted at pH 4 with one-third volume of n-butanol. The solvent extract is concentrated under reduced pressure to remove most of the solvent, and the resulting concentrate is extracted several times with equal volumes of chloroform. The chloroform extract is concentrated to remove most of the chloroform. The resultant concentrate exhibits high antibiotic activity and activity against S–180 and Ca–755 tumors in mice and HeLa cells in tissue culture.

*Example III*

The chloroform extract of Example II is subjected to counter-current distribution in the system chloroform-ligroin-methanol-0.5% aqueous sodium chloride (3:1:3:1). The sample is taken in 5–10 tubes of a 100 tube automatic apparatus. After one hundred transfers, the activity remains in tubes 20–40 as shown by optical density at 360 mμ and by bioassay. The active fractions are combined, concentrated, shaken with chloroform and the solvent extract concentrated to dryness. The product, antibiotic BA–181314A, is crystallized from methanol and recrystallized from pyridine-methanol (1:3) to yield pale yellow rectangular plates melting with decomposition at about 315–320° C. Elemental analysis of BA–181314A shows approximately 59.3% carbon, 4.6% hydrogen, 5.1% nitrogen, the balance being oxygen, and a methoxyl concent of 5.5%. The pure antibiotic gives a green color in alcoholic ferric chloride, a yellow color in concentrated sulfuric acid, a purplish red color in concentrated nitric acid, a reddish brown color and a precipitate in alcoholic lead acetate. The antibiotic shows ultraviolet absorption maxima at 250 mμ, $E_{1cm}^{1\%}=438$, at 361 mμ, $E_{1cm}^{1\%}=285$ and at 375 mμ, $E_{1cm}^{1\%}=308$ It exhibits the characteristic infrared absorption spectrum shown in FIGURE 1, the characteristic absorption maxima are tabulated hereinbefore. The antibiotic demonstrates high antibacterial activity as shown hereinbefore, Table 2. When tested against human uterine carcinoma cells (strain HeLa) grown in tissue culture, the compound causes extensive destruction of the tumor cells at levels of 0.02–0.05 mcg./cc. The anti-tumor activity of antibiotic BA–181314A in mice is shown hereinbefore in Table 3.

We claim:
1. A process for the production of a product containing an antibiotic which comprises cultivation under submerged aerobic conditions of *Streptomyces aspergilloides* in an aqueous nutrient medium comprising a source of assimilable nitrogen, a source of carbohydrate and a source of minerals until substantial antibiotic activity is imparted to said medium.
2. A process as set forth in claim 1 wherein the antibiotic is recovered from the fermentation broth.
3. A process for the production and recovery of an antibiotic which comprises cultivating *Streptomyces aspergilloides*, ATCC 14808, in an aqueous nutrient medium under submerged aerobic conditions until substantial antibiotic activity is imparted to said medium, extracting the antibiotic therefrom with n-butanol, rendering said antibiotic substantially free of solvent, subjecting said antibiotic to counter-current distribution in the system chloroform-ligroin-methanol-0.5% aqueous sodium chloride in the ratio 3:1:3:1 by volume, removing the active fractions, concentrating and extracting with chloroform, concentrating the chloroform extract to dryness and crystallizing from methanol to obtain the antibiotic substance.
4. An antibiotic which crystallizes from a pyridine-methanol (1:3) solution as pale yellow rectangular plates which melt with decomposition at 315–320° C., and which has substantially the following elemental analysis: 59.3% carbon, 4.6% hydrogen, 5.1% nitrogen and the balance being oxygen; a methoxyl content of 5.5%, and which produces a green color with alcoholic ferric chloride, a yellow color with concentrated sulfuric acid, a purplish red color with concentrated nitric acid and a reddish brown color with precipitate with alcoholic lead acetate;

which substance exhibits ultraviolet adsorption maxima at 250 mµ, $E_{1\ cm.}^{1\%}=438$, 361 mµ, $E_{1\ cm.}^{1\%}=285$ and at 375 mµ, $E_{1\ cm.}^{1\%}=308$ and infrared absorption maxima when measured on a potassium bromide pellet at 3400, 2900, 2825, 1630, 1575, 1525, 1460, 1420, 1350, 1298, 1278, 1255, 1212, 1193, 1175, 1128, 1100, 1078, 1048, 1012, 990, 972, 952, 942, 928, 899, 845, 822, 802, 772, 712, 683 and 637 cm.$^{-1}$.

5. An antibiotic composition comprising the product of claim 4 in its fermentation concentrate.

No references cited.

ALBERT T. MEYERS, *Primary Examiner.*
JULIAN S. LEVITT, *Examiner.*
SAM ROSEN, *Assistant Examiner.*